United States Patent [19]
von Huth Smith

[11] 3,995,533
[45] Dec. 7, 1976

[54] HYDRAULIC STEERING UNIT

[75] Inventor: Ulf Martin von Huth Smith, Nordborg, Denmark

[73] Assignee: Danfoss A/S, Nordborg, Denmark

[22] Filed: Feb. 26, 1975

[21] Appl. No.: 553,266

[30] Foreign Application Priority Data
Mar. 1, 1974   Germany .............. 2409739

[52] U.S. Cl. .................. 91/433; 91/451; 91/461
[51] Int. Cl.² ............ F15B 11/10; F15B 13/042
[58] Field of Search ........... 91/451, 390, 433, 461; 180/79.2 R, 79.2 B; 60/385, 386

[56] References Cited
UNITED STATES PATENTS

| | | | |
|---|---|---|---|
| 2,236,467 | 3/1941 | Clench | 60/386 X |
| 2,624,321 | 1/1953 | Levetus | 91/451 |
| 2,931,389 | 4/1960 | Moog, Jr. et al. | 91/433 X |
| 2,954,756 | 10/1960 | Donner et al. | 60/385 X |
| 3,260,325 | 7/1966 | Brown et al. | 180/79.2 B |
| 3,455,209 | 7/1969 | Preston et al. | 91/443 X |
| 3,693,506 | 9/1972 | McMillen et al. | 91/433 X |
| 3,771,424 | 11/1973 | Allen et al. | 91/433 X |

FOREIGN PATENTS OR APPLICATIONS
1,942,086   3/1971   Germany .............. 180/79.2 B

*Primary Examiner*—Irwin C. Cohen

[57] ABSTRACT

The invention relates to a hydraulic steering unit for automotive vehicles. A main feature of the unit is that pressure relief means are provided for relieving excessively high pressures developed in the unit which are caused by the steered wheels encountering road obstacles. The unit includes a pump, a drain tank and a working motor which is connectable to the wheels to be steered. The working motor has complementary expansible chamber means and a control valve is connected to the motor with a pair of supply and exhaust conduits which are selectively connectable to the pump and the tank by the control valve. A shunt line is provided between the pump and the tank and a pressure relief valve is in the shunt line. A manually operated valve controlled by a steering wheel is connected to the pump and the drain tank. A pair of control lines are connected to the manually operated valve which are selectively connectable to the pump and the drain tank by the manually operated valve. The control lines are connected to opposite sides of the working motor control valve and a pair of one way valves are between the pair of supply and exhaust conduits and the pair of control lines for connecting the working motor to the shunt line so that the relief valve can relieve excessive pressures in the working motor.

1 Claim, 1 Drawing Figure

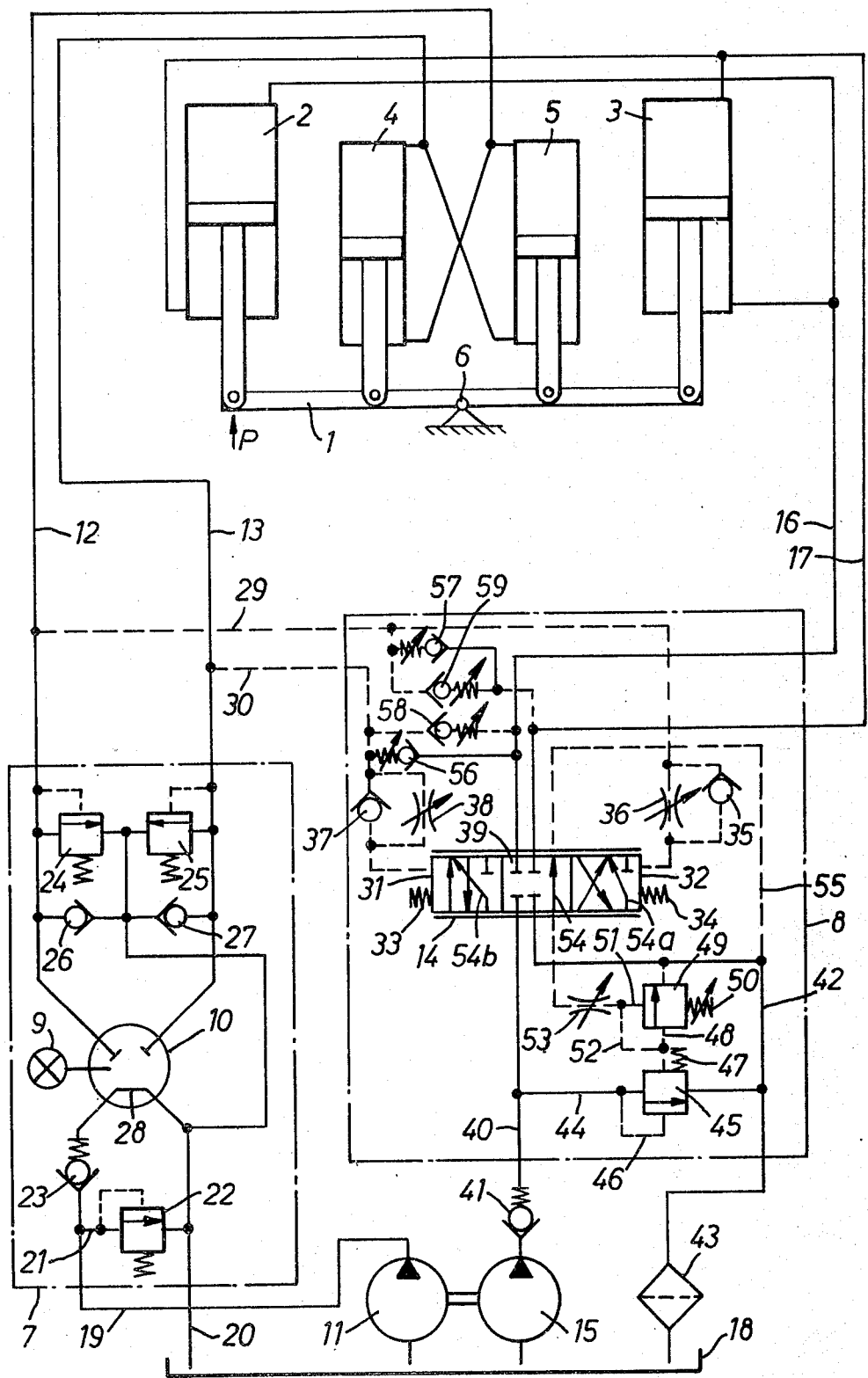

HYDRAULIC STEERING UNIT

The invention relates to a hydraulic steering unit with a pump, a tank, a working motor which is connected over working lines and which adjusts the steering parts, and a control valve, which is adjustable in two working positions in which the working lines from the pump line and the tank line are separated by means of a pressure from a neutral position, supplied over control pressure lines and depending on the operation of a steering hand wheel or the like, in which working position one working line is connected with the pump line and the other working line is connected with the tank line over a short circuit path in which a relief valve is fitted which opens at a predetermined limit pressure.

If suddenly a power affects the steering parts of this steering unit, e.g. if the steering wheels run against an obstacle, an over-pressure will develop at one side of the working motor and the adjacent line which can cause damage. Especially by large working motors relatively big volumes of fluid pressure will be affected by the power.

The present invention seeks quickly to decompose the over-pressures which have been caused by external powers with the very lowest expenditure in a hydraulic steering unit of the above mentioned sort.

The present arrangement includes that each working line is connected with that control pressure line over a supplementary valve which opens at an over-pressure, which leads to such an adjustment of the control valve that the working line which leads the over-pressure is connected with the pump line.

In the present construction the pressure stroke which appears in the working motor will be fed into the control pressure line over the supplementary valve so that the control valve is adjusted. The adjustment is of such a nature that the over-pressure in the pump line gets active. Consequently the relief valve opens towards the tank line whereby the over-pressure is quickly decomposed as to this purpose there are lines with comparatively large cross sections available. The expenditure is inferior as an already available relief valve is used.

In a preferred example of construction is taken care that the relief valve closes at increasing opening cross section of the control valve in the working position, respectively at increasing pressure in the working line, and opens at over-pressure by additional control means. In normal operation the relief valve takes care that the pump is able to deliver continuously. In the neutral position of the control valve the total delivery is carried off over the relief valve. If in one of the working positions the opening cross section of the control valve increases gradually, the relief valve moves towards the closing position, so that the delivery of the pump can remain almost equal. If, however, an over-pressure occurs in the working line, respectively in the pump line, the relief valve will open immediately in order to decompose this over-pressure by a comparatively large cross section.

This might happen, e.g. if on one side the relief valve is controlled by the pressure of the pump line and on the other side by the pressure of a pilot line, which is connected with the tank line over a pilot valve which opens at over-pressure, by which the control input of the pilot valve is connected with a flow switch in the control valve, if convenient over a restriction orifice, which flow switch creates a connection with the tank line in the neutral position and in the working position creates a connection with the working line, which is connected with the pump line. Hereby the over-pressure in the working line can already be read over the flow switch when the control valve is in the working position, after which the pilot valve opens and consequently makes the relief valve open.

If a steering unit is available by which the control pressure lines are connected with supplementary working lines leading from a supplementary control device, which is adjustable by means of the steering hand wheel and which connects a pump with the tank over a short circuit path in the neutral position and connects the pump with one of the supplementary working lines and the tank with the other supplementary working line in its two working positions, to an auxiliary working motor which is mechanically connected with the working motor and in which the supplementary control device comprises a measurement motor which is working as a pump, particularly in cases of emergency, it is recommendable that each of the supplementary valves are shunted by a spring-loaded check valve which opens towards the working lines. These supplementary valves make is possible that in case of emergency the pressure means from the supplementary control device flow not only to the supplementary working motor but also to the working motor if the pump, which is allocated this working motor, falls out.

The invention is described more thoroughly by the aid of an example of construction which is illustrated in the drawing as a connection diagram.

The piston rods of a working motor with two cylinders 2 and 3 as well as a supplementary working motor with two cylinders 4 and 5 act upon a common working arm 1. The arm is pivotable round a firm pivot 6 and is connected with the steering wheels, respectively the vehicle parts.

These motors are controlled by two control units 7 and 8 that can be spacially separated from each other. The control unit 7, which comprises a supplementary control device 10 that can be controlled by means of the steering hand wheel 9, is fed from a pump 11 and supplies the two cylinders 4 and 5 of the supplementary working motor. The other control unit 8 comprises a control valve 14, it is fed by a pump 15 and supplies over working lines 16 and 17 the cylinders 2 and 3 of the working motor. A common tank 18 might be replaced by two tanks, each of which is connected with the control unit 7, respectively 8. The control unit 7 comprises a short circuit line 21 with an over-pressure valve 22 between the pump line 19 and the tank line 20, and in the pump line 19 a check valve 23. Between the supplementary working lines 12 and 13 there is a valve arrangement consisting of two over-pressure valves 24 and 25 and two check valves 26 and 27. In the neutral position the supplementary control device 10 connects the pump 11 over a short circuit path 28 with the tank 18.

During the steering process there is a predetermined pressure in the supplementary working lines 12 and 13. This pressure affects the pressure actuating areas 31 and 32 of the control valve 14 over control pressure lines 29 and 30 which are, however, charged by the neutral position springs 33 and 34. In the control pressure line 29 there is a check valve 35 which opens towards the pressure actuating area 32, said check valve is shunted by an adjustable restriction orifice 36. In the control pressure line 30 there is a check valve 37 which opens towards the pressure actuating area 31, said check valve is shunted by a restriction orifice 38.

If the pressure in these control pressure lines 29 and 30 is the same, the control valve 16 will take in its illustrated neutral position. If the pressure in the control pressure line 29 overbalances, the slide 39 of the control valve 14 will move into one working position, if the pressure in the other control pressure line 30 overbalances, the slide 39 will move into the other working position. The larger the pressure difference, the larger the displacement and the larger the released penetrating cross section of the control valve 14. A pump line 40 leads to the control valve 14 in which pump line there is a check valve 41. Further a tank line 42 with a filter 43 is provided. These two lines are completely separated from the working lines 16 and 17 in the neutral position. In one working position the pump line 40 is connected with the working line 16, in the other working position it is connected with the other working line. Cross sections of the restriction orifice in the control valve 16 take care that a certain amount of pressure means flows to the working motor 2,3 in accordance with the position of the slide 35.

Between the pump line 40 and the tank line 42 there is a short circuit path 44 with a relief valve 45. For the operation of this valve there is placed a connection line 46 on one side, over which the relief valve 45 is admitted with the pump pressure. Further this relief valve 45 is admitted by a spring 47 and the pressure in a pilot line 48, in which there is the pilot valve 49, which opens towards the power of a spring 50 at a predetermined over-pressure and connects the pilot line with the tank line 42. The control input 51 of the pilot valve which is also connected with the pilot line 48 over a line 52, is connected with a flow switch 54 in the control valve 14 over a restriction orifice 53. The flow switch creates in the neutral position the connection with the tank line 42 over a line 55, whereas it creates a connection to the working line 16, respectively 17 in both working positions which working line is connected with the pump line 40, as is illustrated in 54a and 54b.

Between the working line 16 and the control pressure line 30 there is a supplementary valve 56 which opens as soon as the pressure in the working line 16 reaches a predetermined value above the pressure in the control pressure line 30. A similar supplementary valve 57 is placed between the working line 17 and the control pressure line 29. Further these supplementary valves are shunted by spring-loaded check valves 58 and 59 which open in the opposite direction. By this the following process is achieved: The cylinders 4 and 5 of the supplementary working motor act as a feedback. They take care that the amount of pressure means which is supplied to the working motor 2,3 through the control valve 16 is exactly proportional to the amount of pressure means supplied through the supplementary control device 10. In this way the control of large working motors by a small supplementary control device 10 is made possible. Only the control device 7 must be placed in the cab of a vehicle. All other parts can be placed near the working motor. The sole connection between the control devices is created over the signal pressure lines 29 and 30.

In the illustrated neutral position of the control valve 14 the relief valve 45 is completely open, so that the total amount supplied from the pump 14 flows over the short circuit path 44 to the tank. If the slide 39 of the control valve moves into one working position the flow switch 54 will be separated from the tank line 42 and placed on one of the working lines 16,17. Consequently the pressure here will influence on the second control input of the relief valve 45. The more the control valve 14 opens and the pressure in the working line increases, the stronger will the relief valve 45 close. Consequently the relief valve 45 lets the part of the pump volume, which is not needed for the adjustment of the working motor 2,3, flow away over the short circuit path 44. If for one reason or the other the pressure gets too high while the control valve 14 is in the working position, the pilot valve 49 will react. The pilot line 48 opens towards the tank line 42 and the relief valve 45 opens totally, so that the pressure can be decomposed over the tank line 40 and the short circuit path 44.

It is now supposed that the vehicle to be controlled is driving straight forward, that the control valve 14 has the illustrated neutral position and the steering parts are suddenly charged with a power P, which might happen, e.g. by means of a stone in the street. In this case an over-pressure develops in the cylinder 2 which propagates over the working line 16. Because of the pressure of the supplementary valve 56 this over-pressure can immediately influence on the pressure actuating area 31 of the control valve 14. Consequently the slide 39 displaces to the right of the working position, in which the working line 16 is connected with the pump line 40. The over-pressure appears on one side of the control line 46 and by means of the flow switch in the control line 51, so that the pilot valve 49 and the relief valve 45 open. Consequently the pressure in the working line 16 is quickly decomposed. Immediately all parts return to their starting position. If the over-pressure appears while the control valve 14 is already in a working position, the slide 39 will be pushed into a position with larger cross section of the restriction orifice, whereupon the quick pressure decomposition is facilitated after the response of the pilot valve 49 and the relief valve 45.

By a breakdown of the pump 11 the measurement motor in the supplementary control device 10 can work as a hand pump and create the needed control pressure for the adjustment of the control valve 16. By a breakdown of the pump 15 the pump 11 can influence on the supplementary working motor 4,5 in the usual way but further also on the working motor 2,3 over one of the check valves 58,59. If both pumps break down, an emergency control operation is only possible by the aid of the measurement motor working as a hand pump in a similar way.

I claim:

1. A hydraulic steering unit comprising a pump means, a drain tank, a working motor having complementary expansible chamber means, a control valve, a pair of parallel supply and exhaust conduits between said working motor and said control valve which are selectively connectable to said pump means and said tank by said control valve, said control valve having a neutral position relative to said conduits, a shunt line between said pump means and said tank, a pressure relief valve in said shunt line, a manually operated valve connected to said pump means and said drain tank, a pair of parallel control lines connected to said manually operated valve which are selectively connectable to said pump means and said drain tank by said manually operated valve, said control lines being connected to opposite sides of said control valve, a pair of one way valve means disposed respectively in parallel between said pair of supply and exhaust conduits and said pair of control lines for operating said control valve to connect said working motor to said shunt line so that said relief valve can relieve excessive pressures in said working motor, each of said one way valve means opening in the direction permitting flow to said control lines for operating said control valve, pilot valve means connected to said pressure relief valve, said pilot valve means being connectable to said pump means through said control valve to a selected one of said supply and exhaust conduits, said pilot valve means having a closed position corresponding to neutral and partially opened positions of said control valve and an open position corresponding to a fully open position of said control valve, said pilot valve means permitting opening of said relief valve only when said pilot valve means is in an open position.

* * * * *